United States Patent Office 3,040,040
Patented June 19, 1962

3,040,040
18-OXYGENATED STEROIDS AND PROCESS FOR THEIR MANUFACTURE
Oskar Jeger, Zurich, Duilio Arigoni, Zollikerberg, Georg Anner and Charles Meystre, Basel, and Albert Wettstein, Riehen, Switzerland, assignors to Ciba Corporation, a corporation of Delaware
No Drawing. Filed Feb. 9, 1960, Ser. No. 7,528
Claims priority, application Switzerland Feb. 12, 1959
12 Claims. (Cl. 260—239.57)

The present invention relates to a process for the manufacture of 18-oxygenated steroids from 18-unsubstituted steroids.

The 18-oxygenated steroids, particularly 18-oxygenated pregnanes, are of great interest on account of their interesting physiological effects. To this class of compounds there belongs, inter alia, aldosterone which is of considerable importance owing to its specific effect on electrolyte-metabolism. The latter compound, however, is present in the suprarenal glands only in an extremely small quantity. Larger amounts could hitherto only be prepared by total synthesis from simple chemical basic substances by a process involving may steps. By the present process it is now possbile to obtain 18-oxygenated steroids, particularly 18-oxygenated pregnanes, that is to say also aldosterone and its derivatives and related compounds, in a simple manner by direct selective substitution of the angular, non-activated methyl group at the carbon atom 13 in the intact steroid skeleton. In this manner 18-oxygenated steroids can be prepared in any quantity from readily accessible vegetable and animal steroids.

The new process can be divided up into three main parts:

(1) The formation of an 18:20-ether starting from an 18-unsubstituted 20-hydroxy-pregnane, (2) The splitting or oxidative conversion of the 18:20-ether into 18-hydroxy or 18-acid derivatives, (3) The further oxidation of the resulting polyoxygenated 18-hydroxy compounds.

One method of carrying out the process is shown in the following diagram of partial formulae using an 11-oxygenated compound as example:

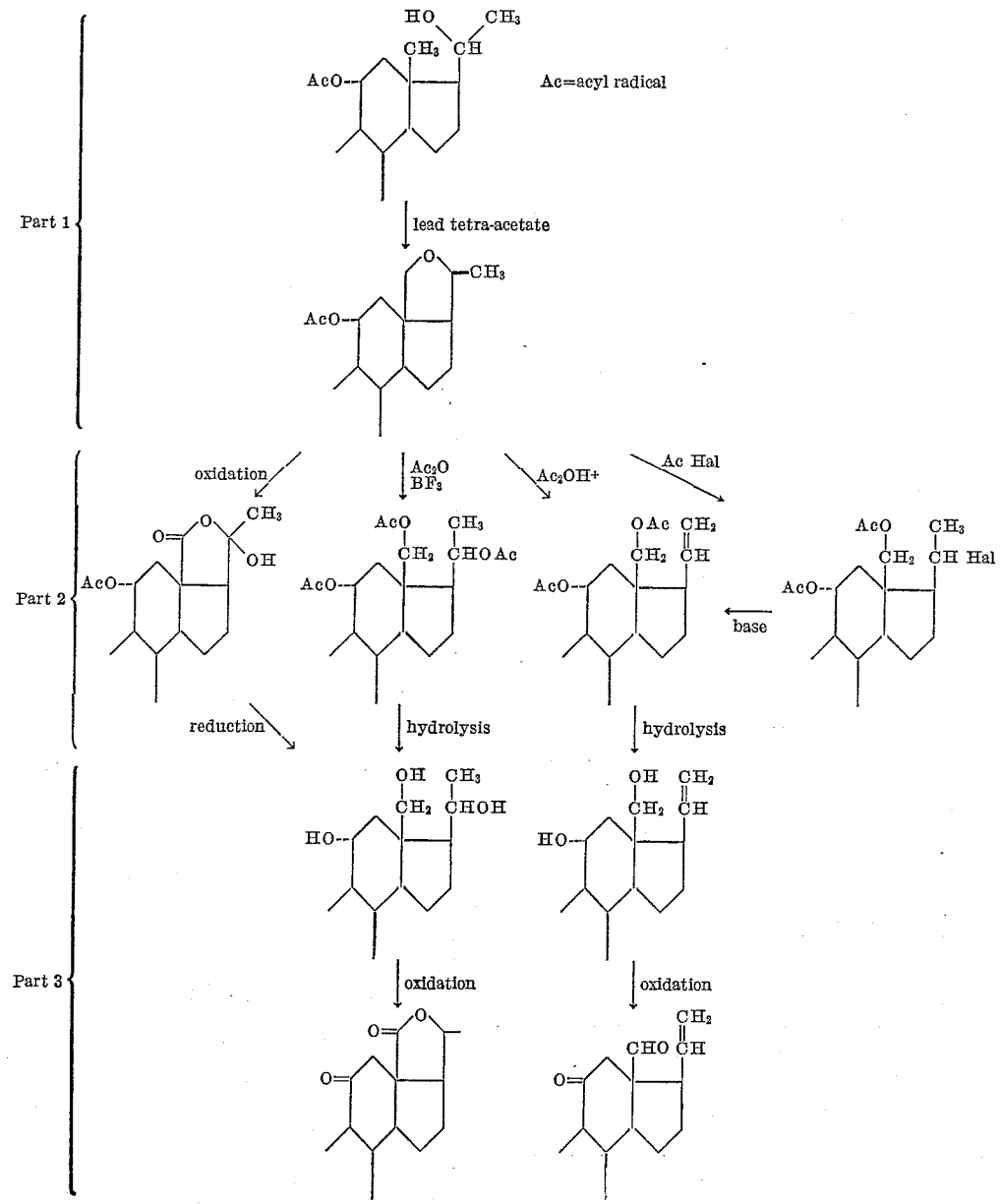

The present application concerns the second part of the above described process, viz. the direct oxidation of 18:20-oxido-steroids. The third part is decribed in co-pending application Serial No. 7,543 filed concurrently herewith and covering conversion to aldosterone and related compounds.

It has been found that 18:20-lactones of 20-keto-pregnane-18-acids and 18:20-lactones of 18-hydroxy-etianic acids can be obtained in a simple manner by treating an 18:20-oxido-pregnane with a strong oxidizing agent.

Especially suitable oxidizing agents are those which can be used under acidic conditions, particularly chromium trioxide, for example in glacial acetic acid or propionic acid, if desired at an elevated temperature. There is obtained by the oxidation according to the present process a mixture of lactones of 18-hydroxy-etianic acids and 20-keto-18-acids which are present in the form of hemiketal lactones (i.e. pseudo acids). The latter can, if desired, be reduced with a complex metal hydride, for example with lithium aluminum hydride to form 18:20-dihydroxy-pregnanes. The pseudo acids can also, if desired, be dehydrated to form 20:18-lactones of $\Delta^{20}$-20-hydroxy-pregnane-18-acids.

As starting materials there are used 18:20-oxido-compounds of the $5\alpha$- and $5\beta$-pregnane series which may contain further substituents in the ring system, particularly in one or more of the positions 1, 2, 3, 4, 5, 6, 7, 8, 9, 10, 11, 12, 14, 15 or 16, such as free or functionally converted hydroxyl or oxo groups alkyl, such as methyl groups, or halogen atoms. Further in the starting material there may be present double bonds, e.g. in 4:5- or 5:6- and/or 9:11-position. By functionally converted hydroxyl and oxo groups there are to be understood esterified or etherified hydroxyl groups or ketalized oxo groups. Free hydroxyl groups, for example in the 3- and/or 11-position are dehydrogenated to oxo groups during oxidation according to the present process. The starting materials are obtained by the process described in patent application No. 7,525, filed concurrently herewith, e.g. by treating 20-hydroxy-pregnanes with lead tetra-acetate. Compounds obtained by the present process which contain no oxygen function in the 11-position can be converted, preferably after formation of the $\Delta^4$-3-keto grouping, into 11-oxygenated compounds with the aid of microorganisms.

Another feature of the present invention are 20-keto-pregnane-18-acids which are chiefly present in the pseudo acid configuration, i.e. as hemiketal lactones, for example the 18:20-lactone of $3\beta$-hydroxy-20-keto-$5\alpha$-pregnane-18-acid and the corresponding enol lactones, for example the 18:20-lactone of $\Delta^{20}$-3:20-dihydroxy-$5\alpha$-pregnene-18-acid and its 3-esters and the compounds substituted in the 11-position by a free or esterified $\alpha$-hydroxy or keto group.

The following examples illustrate the invention.

Example 1

A solution of 1 gram of chromium trioxide in 2 cc. of water and 20 cc. of glacial acetic acid is added slowly dropwise to a solution of 500 mg. of $3\beta$-acetoxy-18:20$\beta$-oxido-$5\alpha$-pregnane in 25 cc. of glacial acetic acid, and the whole is then heated under reflux. On working up, a neutral portion is formed which, on being sprinkled with methanol, yields 300 mg. of crystals which in the infrared spectrum (CHCl$_3$) exhibit in addition to the acetate band at $5.78\mu$ a strong lactone band at $5.62\mu$. The product is the lactone of $3\beta$-acetoxy-18-hydroxy-$5\alpha$-etianic acid.

The reduction of this lactone with lithium aluminum hydride in dioxane solution leads to crystalline $3\beta$:18:20$\beta$-trihydroxy-$5\alpha$-21-nor-pregnane.

Example 2

A solution of 300 mg. of chromium trioxide in 10 cc. of acetic acid of 90% strength is added dropwise at boiling temperature to 300 mg. of $3\beta$-acetoxy-18:20$\beta$-oxido-$5\alpha$-pregnane dissolved in 10 cc. of glacial acetic acid. After 15 minutes a few drops of methanol are added and the mixture worked up in the customary manner with ether. The resulting crude product (245 mg.) can be purified by chromatography on a column of 25 grams of acid silica gel. The benzene eluates (100 mg.) consist mainly of unchanged starting material which is identified by a mixed melting point test. With a mixture of benzene and ether (50:1) a total of 50 mg. of crystals can be eluated whose melting point is constant at 159–160° C. after recrystallization from dilute methanol. For the purpose of analysis a test portion is sublimed at 150° C. in a high vacuum. Optical rotation: $[\alpha]_D = +2°$ (in chloroform). The product is the 18:20-lactone of $3\beta$-acetoxy-18-hydroxy-$5\alpha$-etianic acid.

Further eluation of the column with mixture of benzene and ether (9:1) and crystallization of the eluate from methylene chloride and heptane yield 55 mg. of needles melting at 207–208° C. For the purpose of analysis the product is dried for 3 days at 110° C. in a high vacuum. Optical rotation: $[\alpha]_D = +10°$ (in chloroform); $pK_{MCS} = 8.88$. The product is $3\beta$-acetoxy-20-keto-$5\alpha$-pregnane-18-acid in the form of the pseudo acid of the partial formula

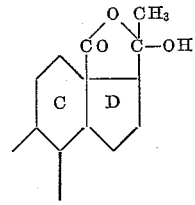

In an analogous manner there is obtained by oxidation of 3:11-diketo-18:20-oxido-$5\beta$-pregnane with chromium trioxide in glacial acetic acid and purification of the crude product by chromatography on aluminium oxide the 18:20-lactone of 3:11:20-triketo-$5\beta$-pregnane-18-acid which, after crystallization from a mixture of methylene chloride and ether, melts at 213.5–214° C.

34 mg. of the above described $3\beta$-acetoxy-20-keto-$5\alpha$-pregnane-18-acid are dissolved in 5 cc. of pyridine, 2 cc. of phosphorus oxychloride are added to the solution and the whole heated for 2 hours at 80° C. After cooling, the reaction mixture is poured into ice-cold water, taken up in ether and the ethereal solution washed exhaustively with 2 N-hydrochloric acid, dilute sodium carbonate solution and with water. After evaporating the ether, 27 mg. of a crystalline product are obtained which after being recrystallized three times from dilute methanol melts at 179–180° C. Infrared absorption bands (KBr) at $5.59\mu$, $5.80\mu$, $5.90\mu$, $6.01\mu$ and $11.90\mu$. The product is the 18:20-lactone of $\Delta^{20}$-$3\beta$-acetoxy-20-hydroxy-$5\alpha$-pregnane-18-acid of the partial formula

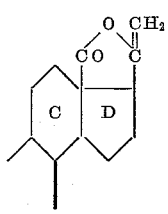

What is claimed is:
1. Process for the manufacture of 18:20-lactones of a member selected from the group consisting of 20-keto-pregnane-18-acids and 18-hydroxy-etianic acids and a derivative thereof unsaturated in the nucleus wherein a corresponding 18:20-oxido-steroid of the pregnane series is treated with chromium trioxide under acidic conditions.

2. Process as claimed in claim 1, wherein the resulting 18:20-lactone of a 20-keto-pregnane-18-acid is reduced with lithium aluminium hydride.

3. Process as claimed in claim 1, wherein the resulting 18:20-lactone of a 20-keto-pregnane-18-acid is dehydrated to form an 18:20-lactone of a $\Delta^{20}$-20-hydroxy-pregnane-18-acid.

4. Process as claimed in claim 1, wherein 18:20-oxido-3β-acetoxy-5α-pregnane is oxidized by means of chromium trioxide to form the 18:20-lactone of 3β-acetoxy-20-keto-5α-pregnane-18-acid and the resulting lactone reduced by means of lithium aluminum hydride to form 3β:18:20-trihydroxy-5α-pregnane.

5. The 18:20-lactone of 3β-hydroxy-20-keto-5α-pregnane-18-acid.

6. A 3-lower alkanoic acid ester of the compound claimed in claim 5.

7. The 18:20-lactone of $\Delta^{20}$-3β:20-dihydroxy-5α-pregnane-18-acid.

8. A 3-lower alkanoic acid ester of the compound claimed in claim 7.

9. The 18:20-lactone of a $\Delta^{20}$-20-hydroxy-pregnane-18-acid.

10. The 18:20-lactone of $\Delta^{20}$-3β-acetoxy-20-hydroxy-5α-pregnane-18-acid.

11. A compound selected from the group consisting of those having the formulae:

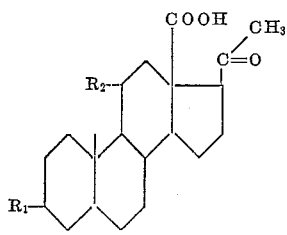

and

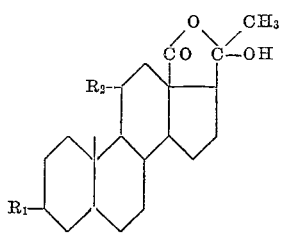

in which $R_1$ is selected from the group consisting of hydroxy, lower alkanoyloxy and oxo and $R_2$ is selected from the group consisting of hydrogen, hydroxy and oxo.

12. A compound of the formula:

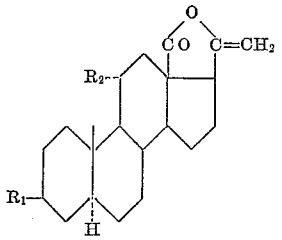

in which $R_1$ is selected from the group consisting of hydroxy, lower alkanoyloxy and oxo and $R_2$ is selected from the group consisting of hydrogen, hydroxy and oxo.

References Cited in the file of this patent

Cainelli et al: Helv. Chim. Acta, vol. 42, No. 3 (1959), pp. 1124–1127.

Fieser et al.: Steroids, Reinhold Publishing Corp., N.Y. (1959), pp. 615 and 630.